US011399467B2

(12) United States Patent
Lebeau et al.

(10) Patent No.: US 11,399,467 B2
(45) Date of Patent: Aug. 2, 2022

(54) BALE WRAPPING DEVICE FOR A ROUND BALER, AND A ROUND BALER

(71) Applicant: DEERE & COMPANY, Moline, IL (US)

(72) Inventors: Jonathan Lebeau, Dijon (FR); Pascal Gresset, Auxon Dessous (FR); Frederic Perrotin, Le Tremblois (FR)

(73) Assignee: DEERE & COMPANY, Moline, IL (US)

( * ) Notice: Subject to any disclaimer, the term of this patent is extended or adjusted under 35 U.S.C. 154(b) by 226 days.

(21) Appl. No.: 16/840,987

(22) Filed: Apr. 6, 2020

(65) Prior Publication Data

US 2020/0323145 A1 Oct. 15, 2020

(30) Foreign Application Priority Data

Apr. 12, 2019 (DE) .......................... 102019205327.0

(51) Int. Cl.
| | | |
|---|---|---|
| *A01F 15/07* | (2006.01) | |
| *B65B 27/12* | (2006.01) | |
| *F16D 49/10* | (2006.01) | |
| *F16H 7/02* | (2006.01) | |
| *F16H 7/08* | (2006.01) | |

(52) U.S. Cl.
CPC ........ *A01F 15/0715* (2013.01); *B65B 27/125* (2013.01); *F16D 49/10* (2013.01); *F16H 7/02* (2013.01); *F16H 7/08* (2013.01); *A01F 2015/072* (2013.01)

(58) Field of Classification Search
CPC ............ A01F 15/0715; A01F 2015/072; A01F 2015/076; F16D 49/10; F16H 7/08; B65B 27/125
See application file for complete search history.

(56) References Cited

U.S. PATENT DOCUMENTS

| | | | |
|---|---|---|---|
| 6,651,408 B1 * | 11/2003 | McClure ............. | A01F 15/0715 242/421.2 |
| 9,677,633 B2 * | 6/2017 | Horner .................... | F16D 49/10 |
| 10,721,870 B2 * | 7/2020 | Chapon .................. | B65B 41/12 |
| 2015/0135639 A1 * | 5/2015 | Vandamme ........... | B65B 27/125 53/74 |

(Continued)

FOREIGN PATENT DOCUMENTS

| | | |
|---|---|---|
| EP | 1872648 A1 | 1/2008 |
| EP | 2982235 A1 | 2/2016 |

(Continued)

OTHER PUBLICATIONS

European Search Report issued in counterpart application No. 20168473.5 dated Sep. 2, 2020 (07 pages).

*Primary Examiner* — Andrew M Tecco

(57) ABSTRACT

A bale wrapping device for a round baler includes a drive roller by which a wrapping material is able to be unrolled from a wrapping material roller. The drive roller is connected to a drive and brake apparatus. The drive and brake apparatus is connected to a brake belt which is able to be tensioned in a variable manner. The bale wrapping device further comprises a tensioning lever apparatus and the brake belt is connected to the tensioning lever apparatus. The pre-tensioning of the brake belt is adjustable by means of the tensioning lever apparatus between at least three different pre-tensionings.

2 Claims, 10 Drawing Sheets

(56) References Cited

U.S. PATENT DOCUMENTS

2016/0037726 A1\* 2/2016 Horner ................... F16D 65/58
 56/341
2018/0042181 A1\* 2/2018 Chapon .................. B65B 41/12

FOREIGN PATENT DOCUMENTS

EP 3284336 A1 2/2018
WO WO2010112373 A1 10/2010

\* cited by examiner

BALE WRAPPING DEVICE FOR A ROUND BALER, AND A ROUND BALER

CROSS-REFERENCE TO RELATED APPLICATIONS

This application claims priority to and the benefit of German Patent Application No. 102019205327.0, filed on Apr. 12, 2019, the disclosure of which is hereby incorporated by reference.

TECHNICAL FIELD

The disclosure generally relates to a bale wrapping device for a round baler.

BACKGROUND

Round balers are known. It is also known to provide round balers with a bale wrapping device, whereby a pressed round bale is wrapped with a wrapping material and may be subsequently ejected in wrapped form. The round bale is shaped in a pressing chamber, in particular a cylindrical pressing chamber, of the round baler during a bale forming phase. To this end, harvested crops lying on the ground are conveyed by a harvested crop pick-up apparatus into the pressing chamber and a cylindrical round bale is formed by the pressing means arranged therein. The pressing chamber may be configured as a fixed pressing chamber with cylindrically arranged pressing rollers or even as a variable pressing chamber with variable pressing means, for example pressing belts or pressing chains.

In an introduction phase following the bale forming phase, a wrapping material is guided into the pressing chamber from a wrapping material roller in the direction of the round bale which has been formed in the meantime and entrained from the outside of the bale. Generally netting, film or twine is used as the wrapping material. In a wrapping phase, the wrapping material is guided around the round bales by the rotating round bales. A cutting phase follows, in which the wrapping material is cut from the bale by a cutting apparatus before the bale is ejected in the bale ejection phase and/or deposited onto the ground. It has proved to be a drawback, in particular in the case of films, that with different wrapping materials variable load relief and/or tightening and/or tensioning of the wrapping material is also required. For example, it may be necessary to set a braking force or accelerating force according to the type of material of the wrapping material and/or to permit said force to act on the wrapping material roller and/or the wrapping material, in particular also for the corresponding phases. If the load relief and/or tightening and/or tensioning of the wrapping material is inappropriate, it may lead to the wrapping material becoming entangled with the pressing means or even to the wrapping material being incorrectly cut, which in some circumstances would disrupt or even interrupt the bale pressing process. Moreover, if an inappropriate braking force acts on the wrapping material roller, the wrapping material may become damaged, which has to be avoided.

SUMMARY

According to the disclosure, a bale wrapping device for a round baler is proposed. The bale wrapping device includes a drive roller, a wrapping material being able to be unrolled thereby from a wrapping material roller, wherein the driver roller is connected to a drive and brake apparatus. The drive and brake apparatus is connected to a brake belt or band which is able to be tensioned in a variable manner. The bale wrapping device further includes a tensioning lever apparatus and the brake belt is connected to the tensioning lever apparatus. A pre-tensioning of the brake belt is adjustable, preferably able to be set and/or fixed, particularly preferably able to be set and/or fixed in a stepless manner, by means of the tensioning lever apparatus between at least three different pre-tensionings. In particular, the bale wrapping device is designed such that the pre-tensioning of the brake belt is adjustable by means of the tensioning lever apparatus between at least three different pre-tensionings.

In other words, therefore, the pre-tensioning of the brake belt may be adjustable by means of the tensioning lever apparatus, in particular in a deactivated operating state of the bale wrapping device and/or the drive and brake device, such that the pre-tensioning of the brake belt may be movable between a first pre-tensioning and a second pre-tensioning, which in particular is smaller than the first pre-tensioning, and a third pre-tensioning, wherein in particular the third pre-tensioning is smaller than the first and the second pre-tensioning. Specifically, in a deactivated operating state of the bale wrapping device, in particular, the first pre-tensioning may be a maximum pre-tensioning and the third pre-tensioning may be an idle state in which the brake belt has no pre-tensioning. The second pre-tensioning may thus be adjustable, in particular is able to be fixed and/or set, in a range which is smaller than the first pre-tensioning and greater than the third pre-tensioning. Similarly, however, further pre-tensionings, i.e. adjustable pre-tensionings, may be provided, wherein in each case it applies that the pre-tensioning "n" is smaller than the pre-tensioning "n−1", and the first pre-tensioning may be a maximum pre-tensioning and the nth pre-tensioning may be an idle state, for example where n=4, 5, 6, 7, 8, 9, 10, etc. The pre-tensioning, however, may also be adjustable in a stepless manner between at least three pre-tensionings. The pre-tensioning may be a tensioning of the brake belt in the deactivated operating state of the bale wrapping device. The belt tensioning may be a tensioning which is additionally applied in the active operating state to the brake belt and which may be provided by means of a tensioning device. A brake torque of the drive roller may be proportional to the sum of the pre-tensioning and the belt tensioning. It is possible to set the brake torque in a range of 0 Nm to 200 Nm, preferably 0 Nm to 150 Nm, particularly preferably 0 Nm to 100 Nm. The brake belt may be fastened at a first end to the tensioning lever apparatus, placed around the drive and brake apparatus and connected at a second end to the tensioning device. The tensioning lever apparatus may be fixed to the frame or a side wall of the round baler.

The drive roller may be connected to the drive and brake apparatus, in particular connected fixedly in terms of rotation. The drive and brake apparatus may be connected to a variably tensionable drive belt and/or to the variable tensionable brake belt. The drive and brake apparatus may be connected to drive means so that the drive roller is drivable, in particular is rotatable, by means of the drive and brake apparatus. In particular, the drive belt may be engaged on the input side with a belt drive roller, wherein said belt drive roller may be connected to the drive means. Driven components, in particular directly or indirectly driven pressing rollers of the round baler, may serve as drive means, such that for example the belt drive roller is connected fixedly in terms of rotation to one of the pressing rollers. It is also conceivable here to select a separate drive for the belt drive roller, i.e. a drive which is separate from the pressing rollers, for example an electric motor, which may be activated according to different operating phases of a round baler, in particular in the introduction phase and/or the wrapping phase and/or the cutting phase.

The bale wrapping device may comprise the wrapping material roller with the wrapping material. The wrapping material may be configured as a film, in particular a plastics film or a film made of plastics or a film comprising plastics or a film coated with plastics. The wrapping material may also be a multilayered composite film made of a combination of different plastics. The mechanical load bearing capacity may have been increased by reinforcing with glass fibers or incorporating a mesh. The drive roller and the wrapping material roller may be spaced apart from one another. In particular, the drive roller and the wrapping material roller may be spaced apart from one another such that they are not able to be brought into engagement with one another.

The wrapping material per se, i.e. the unrolled wrapping material, is able to be brought into engagement with the drive roller so that the wrapping material roller is able to be driven indirectly by means of the wrapping material which is in engagement with the drive roller, by the wrapping material being able to be unrolled by means of the drive roller and being able to be guided into the pressing chamber. Thus it is possible for the wrapping material roller to be drivable by means of the drive roller, by the wrapping material being unrolled.

Moreover, the round baler, in particular the bale wrapping device, may additionally comprise a further wrapping material roller having a twine or a film of a different type or a netting as further wrapping material. The wrapping material roller may be arranged in a first compartment and the further wrapping material roller may be arranged in a second compartment of the round baler, in particular of the bale wrapping device. The first and second compartment may be spaced apart from one another or adjacent to one another. The drive roller may be brought into and/or may be in engagement with the further wrapping material roller and/or may be in a frictional connection therewith. The wrapping material and the further wrapping material may be supplied at the same time to the pressing chamber but preferably either the wrapping material may be supplied to the pressing chamber or the further wrapping material may be supplied to the pressing chamber. It is possible that the further wrapping material roller is drivable by means of the drive roller, in particular the further wrapping material may also be unrolled by means of the drive roller, so that the further wrapping material is dispensed and guidable into the pressing chamber. It is possible that the further wrapping material roller is drivable by means of the drive roller, by the drive roller directly transmitting its rotational movement to the further wrapping material roller which is in engagement therewith. The drive and brake apparatus connected to the drive roller may be acted upon by means of the drive belt such that the drive roller, in particular during the introduction phase, is subjected to a drive torque, so that wrapping material is dispensed from the wrapping material roller and/or the further wrapping material is dispensed from the further wrapping material roller and guidable into the pressing chamber. The drive and brake apparatus connected to the drive roller may be acted upon by means of the brake belt such that the drive roller, in particular during the wrapping phase and/or cutting phase, is subjected to a brake torque so that the wrapping material which is entrained and/or pulled along by the bale and/or the further wrapping material is tensioned and/or a wrapping material may be cut with optimized wrapping material tensioning. By means of the variably tensionable drive and/or brake belt, therefore, and in different operating positions of the bale wrapping device, drive and/or brake torques which may be set independently of one another may be implemented on the drive and brake apparatus and/or on the drive roller and/or an optimization of the load relief and/or tightening and/or tensioning of the wrapping material may be possible, in particular an optimization according to the bale pressing phases.

The pre-tensioning of the brake belt, in particular in a deactivated operating state of the bale wrapping device and/or the drive and brake apparatus, is adjustable by means of the tensioning lever apparatus in at least three different pre-tensionings, a brake torque of the drive and brake apparatus may be adjusted and/or set according to the type of wrapping material. As a result, a load relief and/or tightening and/or tensioning of the wrapping material may be advantageously achieved according to the type of wrapping material, for example according to the modulus of elasticity of the wrapping material. In particular, the pre-tensioning and/or the brake torque may be set according to the type of material such that as a result the wrapping material, which is entrained and/or carried along by the round bale, is optimally tensioned in the wrapping phase and/or the wrapping material may be cut with optimized wrapping material tensioning in the cutting phase. Moreover, damage and/or tearing of the wrapping material may thus be advantageously avoided.

In an embodiment of the disclosure, the drive and brake apparatus includes at least one brake drum. The brake drum is connected fixedly in terms of rotation to the drive roller and is connected to the brake belt. The brake drum may be configured, for example, as a single drum or pulley with a belt guide. Via the connection of the brake drum to the drive roller, which is fixed in terms of rotation, the drive roller may be braked by the brake belt so that a variable rotational speed of the brake drum results via an adjustable engagement action of the brake belt. In particular, the drive and brake apparatus may also comprise a combined drive and brake drum instead of a brake drum. The combined drive and brake drum may be connected fixedly in terms of rotation to the drive roller and may be connected to the brake and drive belt. In this case, the drive and brake drum may be configured as a single drum or pulley with two parallel belt guides or, for example, even by two pulleys connected together fixedly in terms of rotation. Similarly, via the connection of the drive and brake drum to the drive roller, which is fixed in terms of rotation, said drive roller may be driven via the drive belt and also braked at the same time via the brake belt, so that a variable rotational speed of the drive and brake drum results via an adjustable engagement action of the drive and brake belt.

The drive and brake apparatus may also comprise an actuatable adjusting device acting on the drive belt. Via the adjusting device a belt tensioning may be provided for the drive belt, so that the drive belt is able to be tensioned in a variable manner in different tensioned states. Via the tensioned state of the drive belt, a drive torque acting on the drive and brake drum may be introduced in a variable manner.

Moreover, the bale wrapping device, in particular the drive and brake apparatus, may comprise a tensioning device, e.g., a tensioning lever apparatus, acting on the brake belt. The tensioning device may also be actuatable. A belt tensioning for the brake belt may be provided via the tensioning device so that in the operating state the brake belt is able to be tensioned in a variable manner in different tensioned states. A brake torque acting on the drive and brake apparatus may be introduced in a variable manner via the tensioned state of the brake belt.

In the operating state of the bale wrapping device, in particular the drive and brake apparatus, therefore, the belt tensioning of the brake belt may be adjustable and/or is able to be set by means of the tensioning device.

In an embodiment of the disclosure, the tensioning lever apparatus includes a lever rod system, wherein the brake belt, in particular a first end of the brake belt, is connected to the lever rod system. The brake belt, in particular the first end of the brake belt, is adjustable, in particular is able to be fixed and/or displaced and/or set, by the lever rod system, such that the pre-tensioning of the brake belt is adjustable, in particular is able to be fixed and/or set, by means of the lever rod system between at least three different pre-tensionings. The lever rod system may be adjustable automatically or manually. The tensioning lever apparatus may comprise an actuator, for example an electric motor or an actuating cylinder, which cooperates with the lever rod system. Similarly, the tensioning lever apparatus may comprise a tensioning lever, in particular an actuatable tensioning lever, which cooperates with the lever rod system. The tensioning lever may be actuatable manually or even by means of the actuator. The tensioning lever may be fixed and/or locked by means of a clip. The lever rod system may be adjustable, in particular is able to be fixed and/or set, particularly preferably is manually or automatically adjustable, in particular is able to be fixed and/or set by the tensioning lever and/or the actuator. When actuating the actuator and/or the tensioning lever, the lever rod system may be adjusted, in particular displaced. In particular, the actuator and/or the tensioning lever may in turn cooperate with and/or be connected to the brake belt, in particular the first end of the brake belt, such that an actuation of the actuator and/or the tensioning lever effects an adjustment of the lever rod system and the lever rod system in turn effects a displacement of the first end of the brake belt, whereby the pre-tensioning of the brake belt is adjusted. Thus the lever rod system may be actuatable by the actuator and/or the tensioning lever and namely such that the pre-tensioning of the brake belt is able to be set and/or fixed between at least three different pre-tensionings by means of the tensioning lever apparatus, in particular the lever rod system. In particular, the brake belt, in particular the first end of the brake belt, in particular in a deactivated operating state of the bale wrapping device and/or the drive and brake apparatus, is adjustable, in particular displaceable, and/or able to be fixed and/or set by the lever rod system, such that the pre-tensioning of the brake belt may be movable between a first pre-tensioning and a second pre-tensioning, which in particular is smaller than the first pre-tensioning, and a third pre-tensioning. The third pre-tensioning may be smaller than the first and second pre-tensioning. Similarly, the brake belt, in particular the first end of the brake belt, may be adjustable by the lever rod system and the lever rod system may be adjustable by the actuator and/or tensioning lever, in particular in a deactivated state of the bale wrapping device and/or the drive and brake device, such that the actuator and/or the tensioning lever may be movable between a first position in which the brake belt has a first pre-tensioning and a second position in which the brake belt has a second pre-tensioning and a third position in which the brake belt has a third pre-tensioning. The second pre-tensioning may in this case be smaller than the first pre-tensioning and the third pre-tensioning may be smaller than the first and second pre-tensioning. The first position of the actuator and/or tensioning lever in this case may correlate to the first pre-tensioning which, in particular, may be a maximum pre-tensioning. The third position of the actuator and/or tensioning lever may in this case correlate to the third pre-tensioning which, in particular, may be an idle state in which the brake belt has no pre-tensioning, since the brake belt is released from the drive and brake drum. Thus the second pre-tensioning may be adjustable in a range which is smaller than the first pre-tensioning and greater than the third pre-tensioning. Advantageously, therefore, the pre-tensioning and/or the brake torque may be set according to the type of material, such that as a result the wrapping material, which is entrained and/or pulled along by the bale, is optimally tensioned and/or the wrapping material may be cut at an optimized wrapping material tension. Moreover, in this manner damage to the wrapping material and/or tearing of the wrapping material may be advantageously avoided.

The adjusting device acting on the drive belt and the tensioning device acting on the brake belt are preferably connected together, wherein by actuating the adjusting device which acts on the drive belt, the tensioning device which acts on the brake belt is actuatable. The connection of the adjusting device and the tensioning device may be implemented by mechanical, hydraulic or even electrical adjusting means, which are mechanically connected to one another. It is also conceivable to produce a non-mechanical connection between the adjusting device and the tensioning device via electronic means, so that for example both devices are actuatable via adjusting means which in each case are mechanically separate but electronically activatable. In terms of a connection, the adjusting device and the tensioning device are thus connected together by the control unit so that the tensioning device would be electronically activated as a function of the adjusting device.

The drive belt may be in engagement on the input side with a belt drive roller, wherein said belt drive roller is connected to drive means. Driven components, in particular directly or indirectly driven pressing rollers of the round baler, serve as drive means such that, for example, the belt drive roller is connected fixedly in terms of rotation to one of the pressing rollers. In this case it is also conceivable to select a separate drive, i.e. a drive for the belt drive roller which is separate from the pressing rollers, for example an electric motor which is able to be activated as a function of different operating phases of a round baler, in particular in an introduction phase, a wrapping phase and/or a cutting phase.

A freewheel apparatus may be provided such that the belt drive roller may run ahead of the drive means for the belt drive roller in the rotational direction of the drive. The belt drive roller is connected, for example, to a freewheel apparatus such that it may run ahead of a driven pressing roller driving the belt drive roller and/or may have a greater speed of rotation and only be connected fixedly in terms of rotation to the pressing roller in the opposing direction.

The above-mentioned adjusting device for the drive belt is preferably able to be activated by a further actuator as a function of different operating phases of a round baler, wherein the operating phases comprise at least one introduction phase, a wrapping phase and a cutting phase. The further actuator may be configured in the form of an electronically or mechanically activatable hydraulic cylinder or electric motor.

A round baler including the aforementioned bale wrapping device may preferably be operated according to a method in which the bale wrapping device includes a tensioning lever apparatus and the brake belt is connected to the tensioning lever apparatus, wherein a pre-tensioning of the brake belt is adjusted by means of the tensioning lever apparatus between at least three different pre-tensionings. In particular, a pre-tensioning of the brake belt may be set in the deactivated operating state of the bale wrapping device, for example when inserting the wrapping material roller. In an introduction phase, in which the wrapping material is supplied to the pressing chamber of a round baler, the drive and brake apparatus may be operated with a first brake torque on the part of the brake belt, in a wrapping phase, in which the wrapping material is wrapped in the pressing chamber around the bale, it may be operated with a second brake torque on the part of the brake belt and in a cutting phase, in which the wrapping material wrapped around the round bale is cut by a cutting device from the wrapping material roller, it may be operated with a third brake torque on the part of the brake belt. On the other hand, the drive and brake apparatus are operated with a first drive torque on the part of the drive belt in the introduction phase, with a second drive torque in the wrapping phase and with a third drive torque in the cutting phase. The bale wrapping device is accordingly operated corresponding to the aforementioned different operating phases in different operating positions with different drive and/or brake torques acting on the drive and brake drum. This results in different drive torques and/or brake torques and/or speeds and/or rotational speeds for a wrapping material roller in engagement with the drive roller, whereby when unrolling the wrapping material from the wrapping material roller different wrapping material tensioned states may be achieved in the different operating phases of the round baler. The wrapping material tensioned state may in this case be produced by the extent of the braking of the wrapping material roller by the drive roller relative to the unrolling speed of the wrapping material from the wrapping material roller, which is produced by the rotation of the bale when the wrapping material is entrained by the bale. In this case, it may be provided that the first brake torque is smaller than the second brake torque and/or the first brake torque is smaller than the third brake torque and/or that the third brake torque is unequal to the second brake torque.

The bale wrapping device according to the disclosure or the round baler according to the disclosure may comprise a control unit. It is possible for the method according to the disclosure to be able to be implemented by the control unit. The round baler, preferably the bale wrapping device and/or the actuator and/or the further actuator, may be signal-connected to the control unit. The round baler, preferably also the bale wrapping device and/or the actuator of the cutting device and/or the adjusting device and the tensioning device, may be set and/or adjusted by the control unit, in other words these elements may be controllable and/or regulatable. The control unit (ECU=electronic control unit or ECM=electronic control module) may be an electronic module and/or an embedded system. The control unit may be configured as part of the bale wrapping device or may be already provided on the round baler or on a traction vehicle, the round baler being pulled thereby. The control unit may also be allocated to the round baler and the traction vehicle. The control unit and the bale wrapping device, in particular the actuator and/or the further actuator, may be connected together by means of a cable or wire, or however wirelessly, i.e. for example by means of radio.

The disclosure and further advantages and advantageous developments and embodiments of the disclosure are described in more detail hereinafter, both with regard to the equipment and the production method thereof, by means of exemplary embodiments and with reference to the drawings. The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

Figure 1:
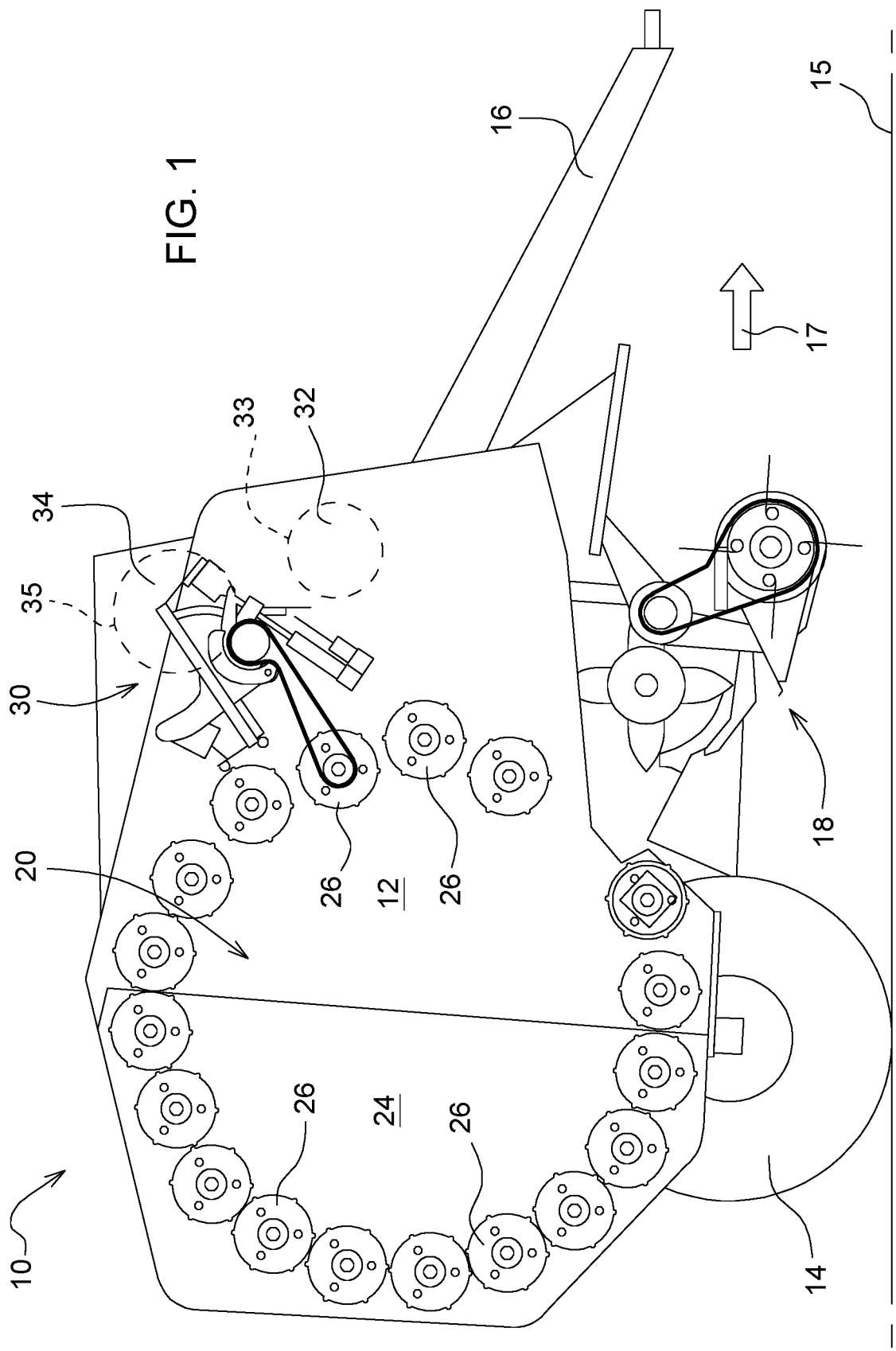
FIG. 1 is a schematic side view of a round baler having a bale wrapping device.
Figure 2:
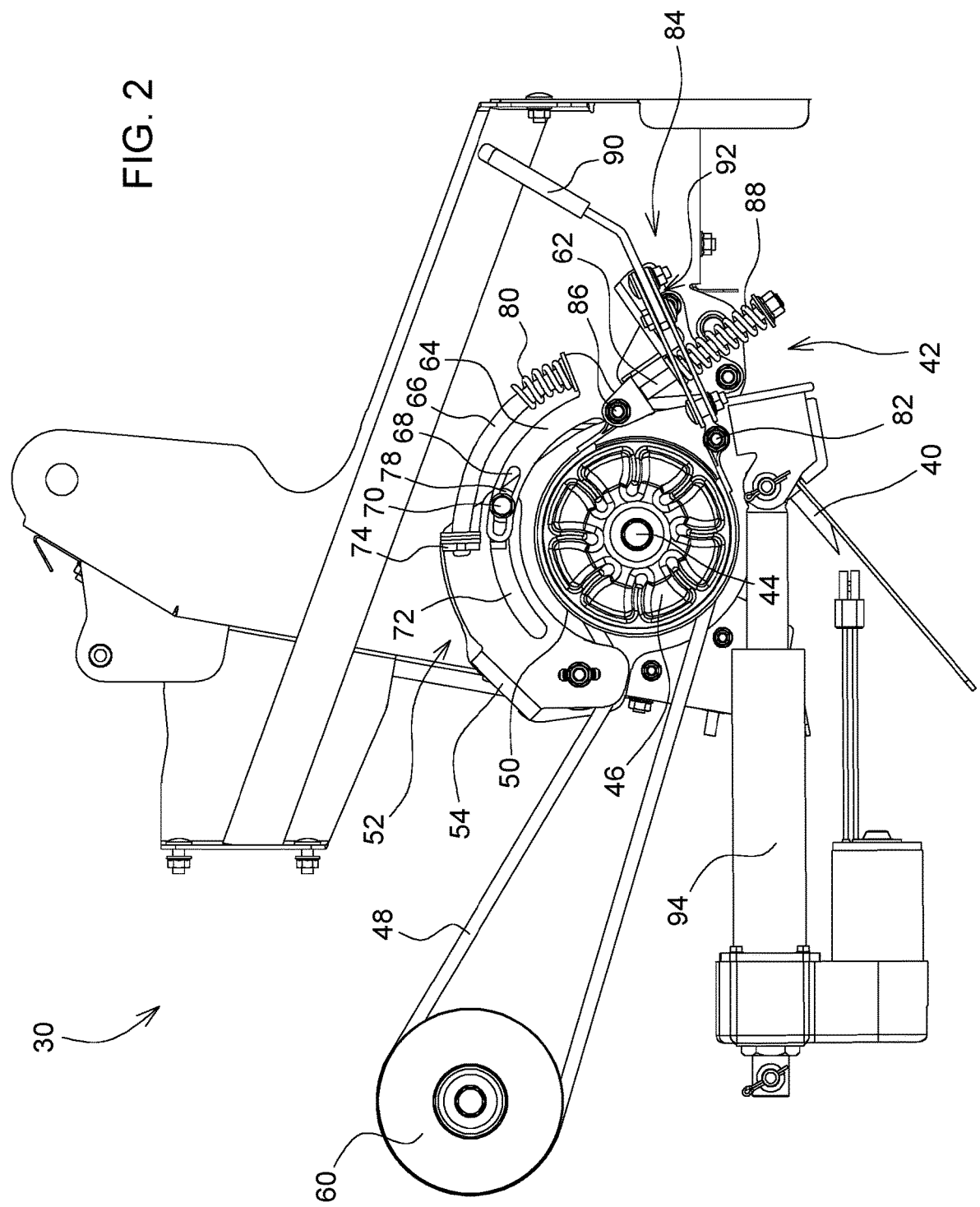
FIG. 2 is an enlarged schematic side view of the bale wrapping device disposed in an operating position for an introduction phase of a baling process.
Figure 3:
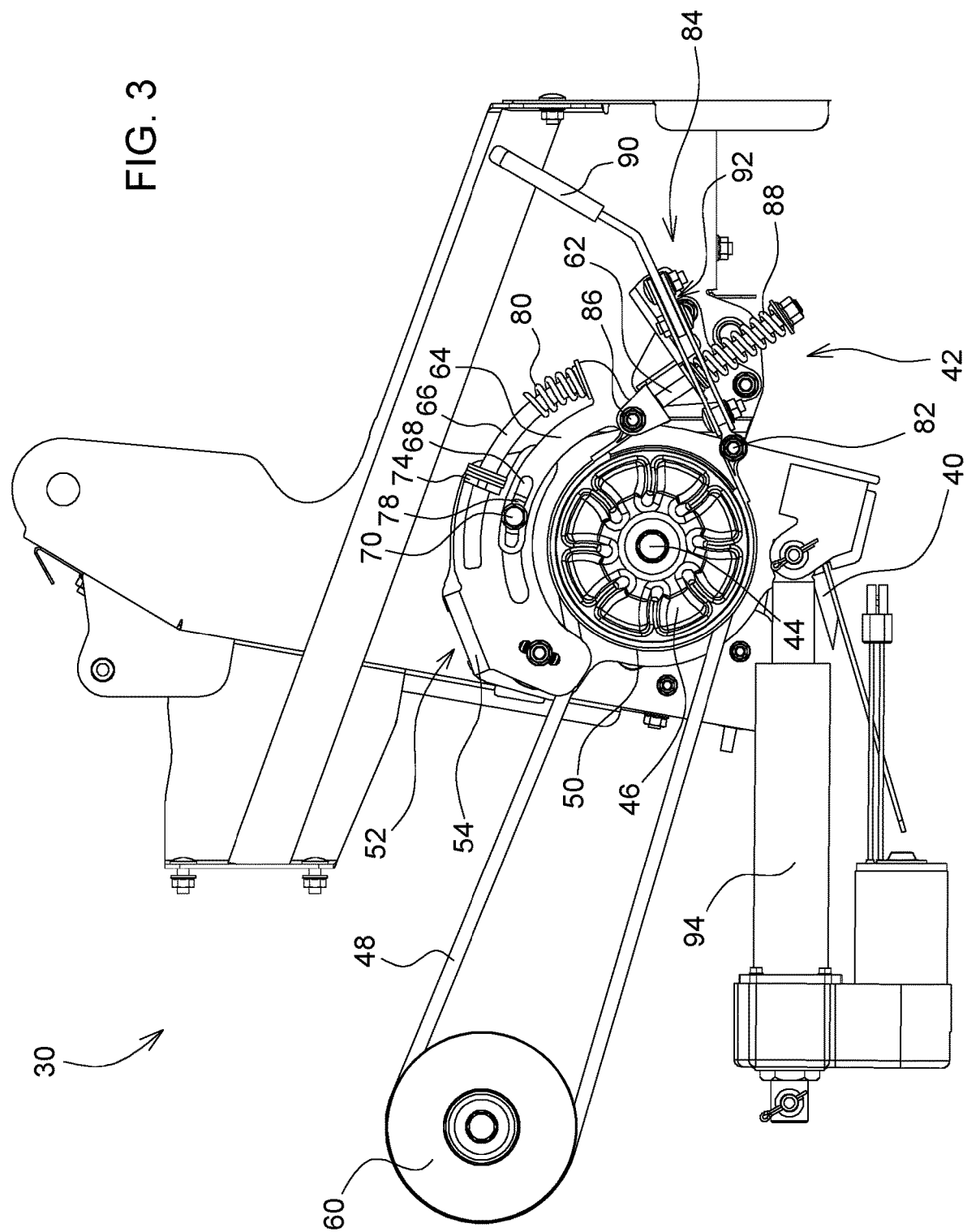
FIG. 3 is an enlarged schematic side view of the bale wrapping device disposed in an operating position for a wrapping phase of the baling process.

Referring to the Figures, wherein like numerals indicate like parts throughout the several views, a round baler is generally shown at 10 in FIG. 1. Referring to FIG. 1, the round baler 10 includes a bale wrapping device 30 according to the disclosure. The round baler 10 shown in FIG. 1 includes a first housing part 12 which is supported on the ground 15 by means of wheels 14, and by means of a towbar 16 is able to be attached to a tractive vehicle, not shown, for example an agricultural tractor or tractor. In the known manner a pick-up and conveying apparatus 18 for harvested crops is located on a front lower side of the first housing part 12, in the forward direction 17, wherein the first housing part 12 surrounds a front part of a pressing chamber 20. A bearing (not shown) for a pivotable second housing part 24 which surrounds a rear part of the pressing chamber 20 is located on the first housing part 12, in particular on the upper region of the first housing part 12. The second housing part 24 in the open state (not shown) opens up an outlet (not shown) through which a bale (not shown) pressed by the round baler 10 may be deposited and/or unloaded or ejected. The pivotable second housing part 24 may be actuated (opened and closed) by means of actuating motors (not shown) and thus represents an outlet flap for a bale pressed in the pressing chamber 20.

The round baler 10 which is configured with a fixed-size pressing chamber 20 contains a plurality of pressing elements, running parallel to one another for pressing harvested crops, in the form of pressing rollers 26 (by way of example here only some of the pressing rollers 26 have been provided with the reference numeral "26"), the rotational axes thereof, when the second housing part 24 is closed, being positioned on a circular arc and at least some thereof being driven. Alternatively, also in the known manner, the round baler 10 as such may be configured with a variable-size pressing chamber 20 and/or as a round baler 10 with a variable pressing chamber 20, wherein also in the known manner the pressing elements may be configured as belts, straps or chain arrangements (not shown).

Moreover, the round baler 10 includes a bale wrapping device 30 which is provided with a wrapping material roller 32. Preferably a film may be used as wrapping material 33. The bale wrapping device 30 may also additionally comprise a further wrapping material roller 34 with a further wrapping material 35. Preferably a different type of film or a netting may be used as further wrapping material 35. The wrapping material roller 32 may be arranged in a first compartment 36 and the further wrapping material roller 34 may be arranged in a second compartment 38 of the round baler 10, in particular the bale wrapping device 30. The first and second compartments 36, 38 may be spaced apart from one another or located adjacent to one another. The bale wrapping device 30 further includes a supply apparatus (not shown) for the wrapping material, by means of which the wrapping material 33 may be guided from the wrapping material roller 32 and/or the further wrapping material 35 may be guided from the further wrapping material roller 34 into the pressing chamber 20. Preferably, the supply apparatus may guide either the wrapping material 33 from the wrapping material roller 32 or the further wrapping material 35 from the further wrapping material roller 34 into the pressing chamber 20.

After the actual pressing process is completed, i.e. the pick-up of harvested crops and the formation of a round bale by the pressing rollers 26, the bale wrapping device 30 is activated and a wrapping process is initiated following the pressing process. When initiating a wrapping process, in an introduction phase by a mechanically triggered supply movement, wrapping material and/or further wrapping material 33, 35 is guided in the direction of the pressing chamber 20 so that a free wrapping material end may come into contact with the round bale rotating in the pressing chamber 20 and the wrapping material and/or further wrapping material 33, 35 is entrained and received. By rotating the round bale, the wrapping material 33 and/or the further wrapping material 35 is wrapped in one or more layers around the periphery of the round bale in a wrapping phase. The wrapping process is completed with a cutting phase in which the wrapping material 33 wrapped around the round bale is cut from the wrapping material roller 32 and/or the further wrapping material 35 is cut from the further wrapping material roller 34 by a blade arrangement 40.

The bale wrapping device 30 may comprise a drive and brake apparatus 42 which is connected to a drive roller 44. The drive roller 44 may be in engagement with the further wrapping material roller 34 and/or may be in a frictional connection therewith. The drive and brake apparatus 42 further includes a combined drive and brake drum 46 which is connected both to a variably tensionable drive belt 48 and to a variably tensionable brake belt 50. The drive and brake drum 46 is connected fixedly in terms of rotation to the drive roller 44 and is also connected to the drive belt 48 and to the brake belt 50.

Figure 7:
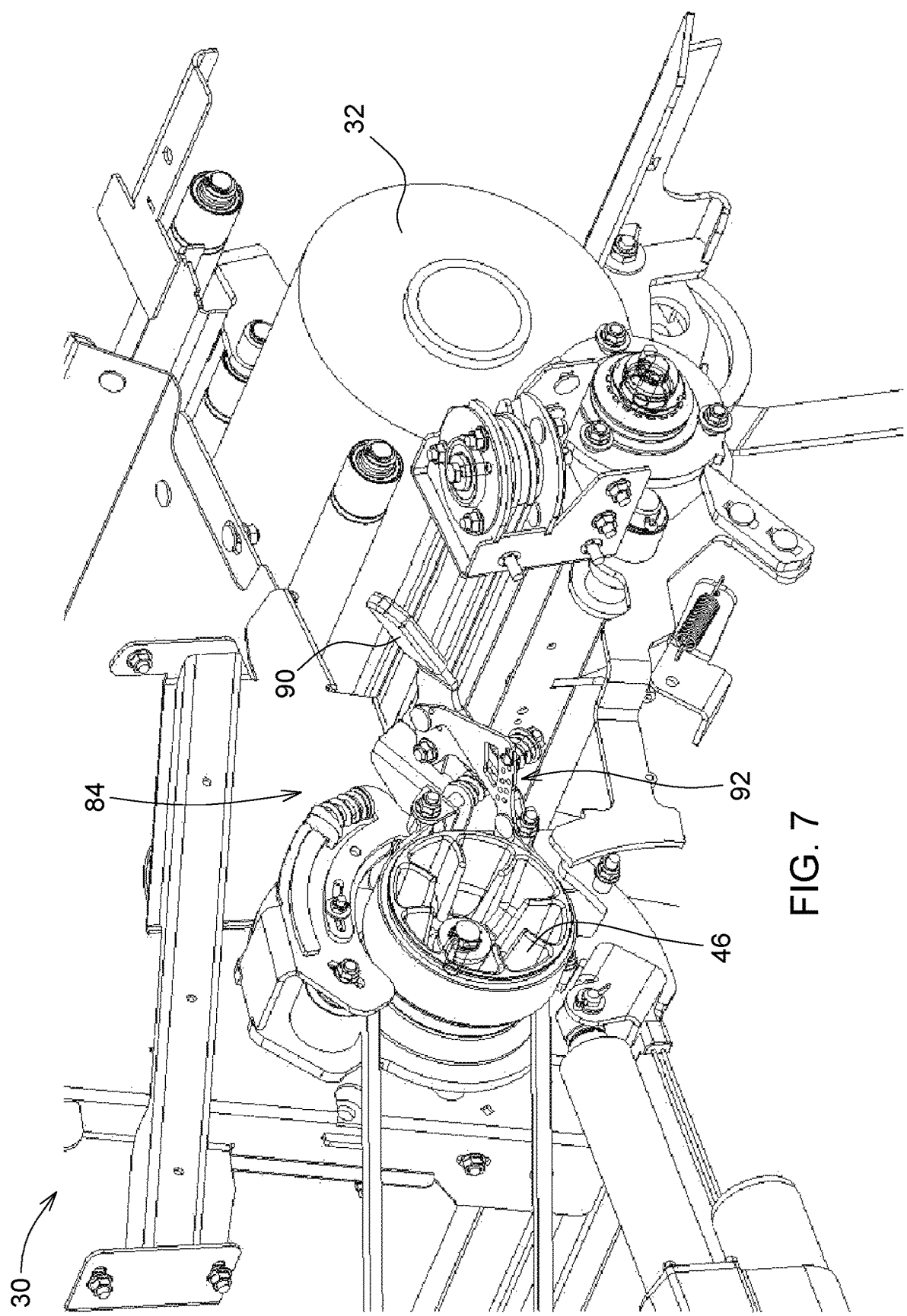
FIG. 7 is an enlarged schematic perspective view of the bale wrapping device showing the tensioning lever apparatus in a third position.
Figure 8:
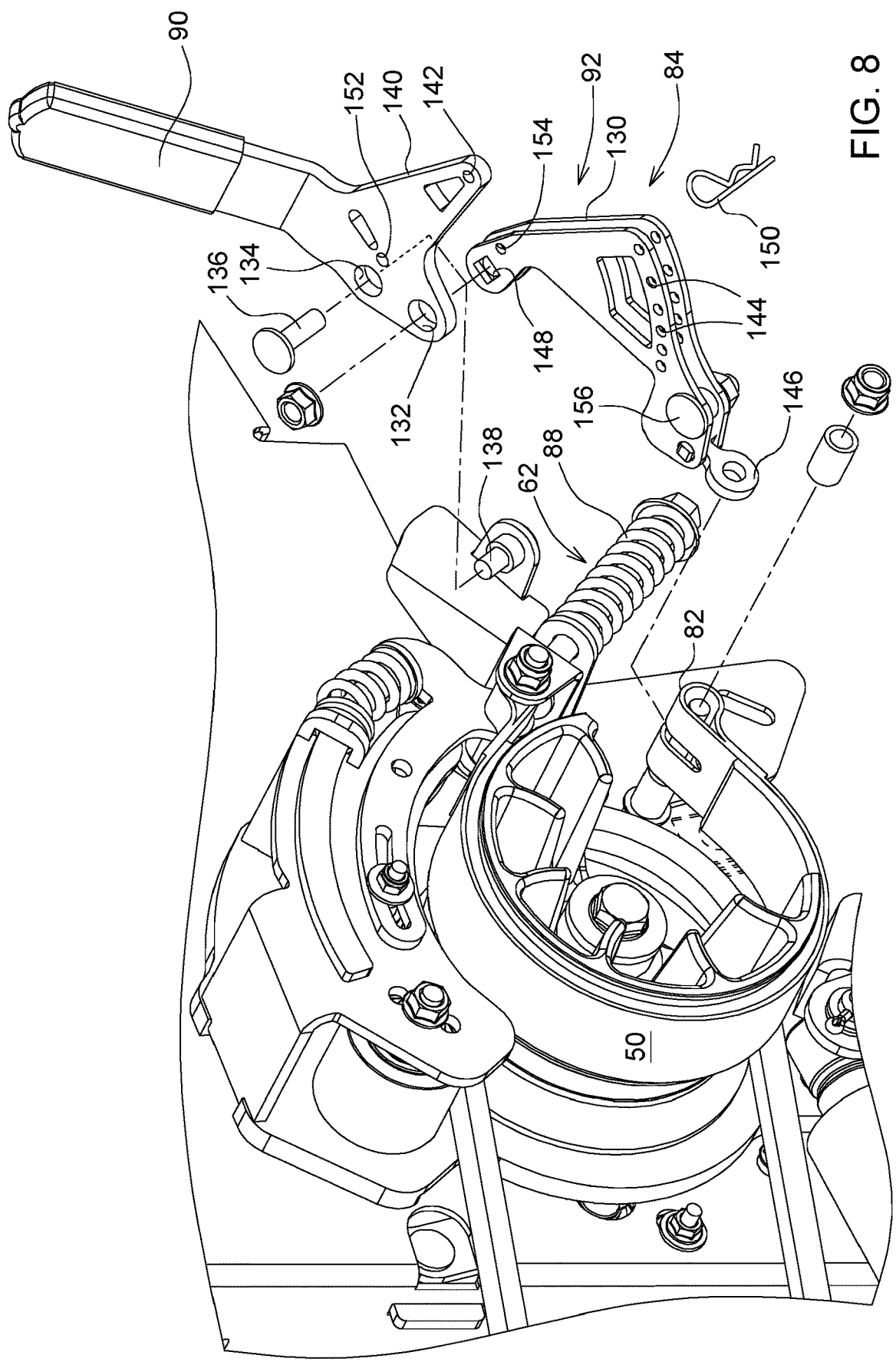
FIG. 8 is an enlarged schematic partially exploded perspective view of the bale wrapping device showing the tensioning lever apparatus.
Figure 9:
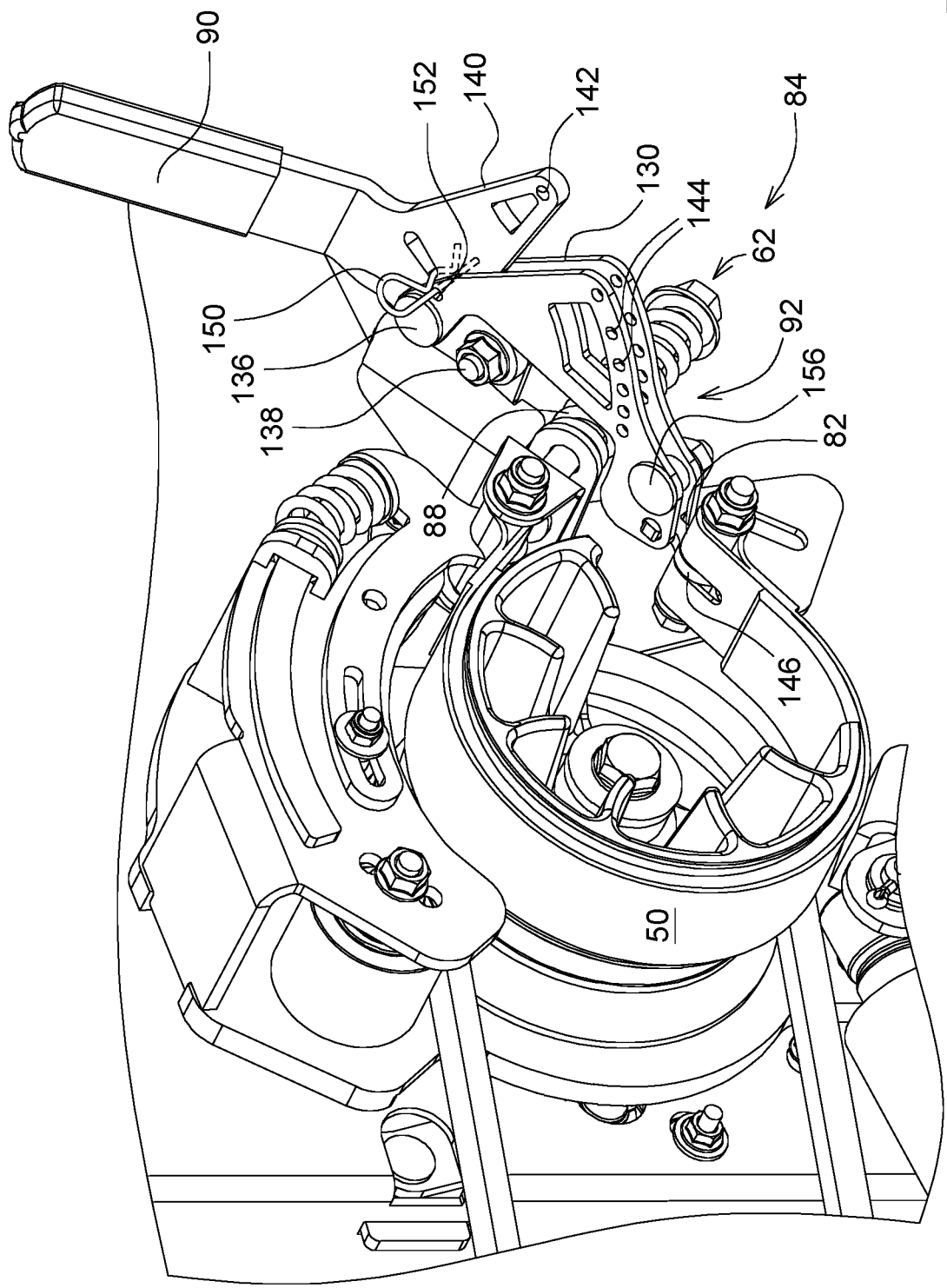
FIG. 9 is an enlarged schematic perspective view of the bale wrapping device showing the tensioning lever apparatus in the first position.
Figure 12:
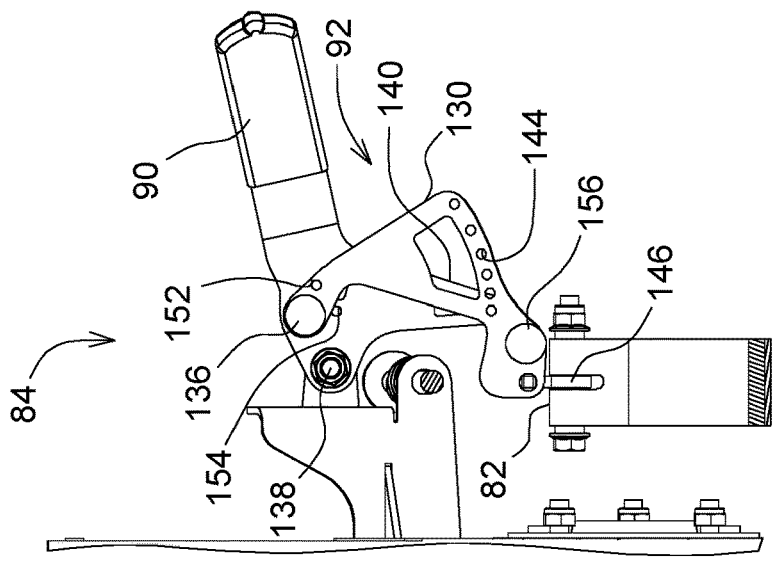
FIG. 12 is a schematic plan view of the tensioning lever apparatus in the third position.
Figure 11:
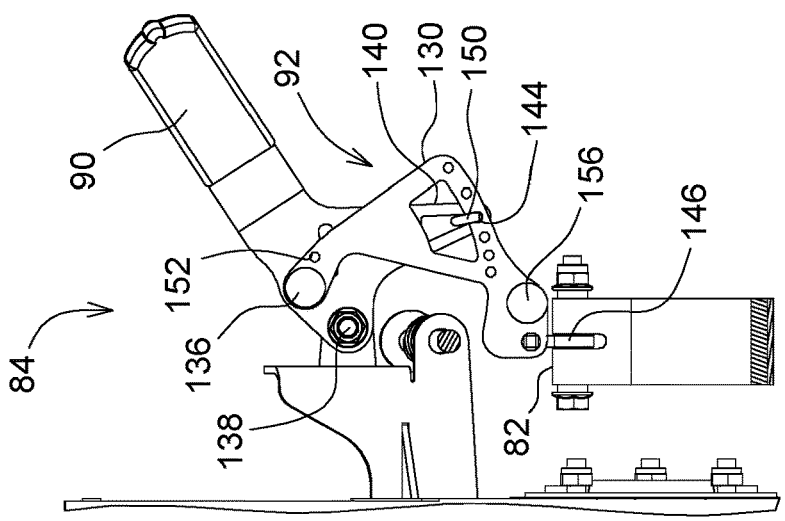
FIG. 11 is a schematic plan view of the tensioning lever apparatus in the second position.
Figure 10:
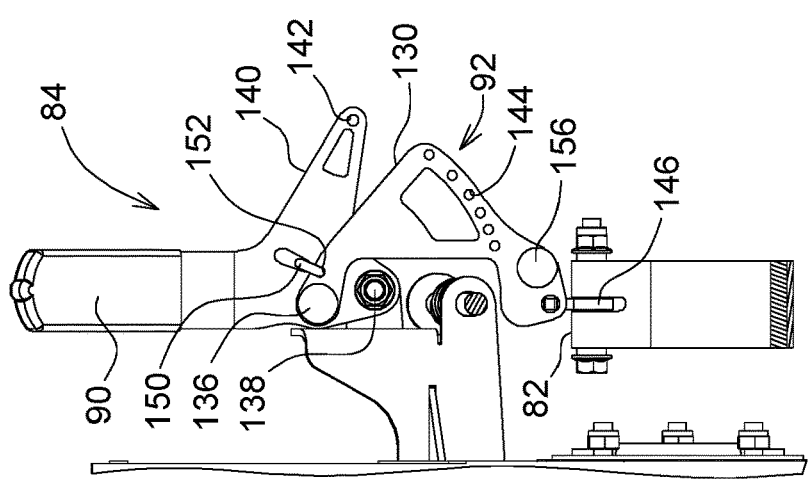
FIG. 10 is a schematic plan view of the tensioning lever apparatus in the first position.

The further enlarged schematic views or side views of the bale wrapping device 30 shown in FIGS. 2 to 12 substantially correspond to the bale wrapping device 30 shown in FIG. 1, so that hereinafter only details and/or differences are specified. In particular, FIGS. 5 to 12 show a further enlarged schematic view of the bale wrapping device of FIG. 1 with a tensioning lever apparatus in a first position (FIGS. 5, 9, and 10), second position (FIGS. 6 and 11) and third position (FIGS. 7 and 12). As also shown in FIGS. 2 to 7 in detail, the bale wrapping device 30 includes the drive and brake apparatus 42 which is connected to the drive roller 44. The drive roller 44 and the wrapping material roller 32 are spaced apart from one another, in particular spaced apart from one another such that they may not be brought into engagement with one another. The drive and brake apparatus 42 further includes the combined drive and brake drum 46 which is connected to a variably tensionable drive belt 48 and to a variably tensionable brake belt 50. The drive and brake drum 46 is connected fixedly in terms of rotation to the drive roller 44 and is also connected to the drive belt 48 and to the brake belt 50.

The drive and brake apparatus 42 includes an actuatable adjusting device 52 which is adjustable in the peripheral direction of the drive and brake drum 46 and which acts on the drive belt 48. The drive belt 48 is placed on one side around a belt drive roller 60, which is connected fixedly in terms of rotation to a drive element. In this case, one of the pressing rollers 26 which is set in rotation by the bale during the bale formation process serves as the drive element. On the side of the drive belt 48 opposing the one side said drive belt 48 is placed around the drive and brake drum 46. By means of the adjusting device 52 the drive belt 48 may be brought into different tensioned states, by said adjusting device 52 being pressed at different strengths against the drive belt 48, as is shown in particular in FIGS. 2 to 4. As a function thereof, by the changing frictional connection between the belt drive roller 60 and the drive belt 48 and/or between the drive and brake drum 46 and the drive belt 48, different drive torques are transmitted from the belt drive roller 60 to the drive and brake drum 46.

The bale wrapping device 30 further includes an actuatable tensioning device 62 which acts on the brake belt 50 and which also extends adjustably in the peripheral direction of the drive and brake drum 46, and partially encloses this drive and brake drum in the peripheral direction. The tensioning device 62 has a first arcuate guide arm 64 and a second arcuate guide arm 66. Both guide arms 64, 66 run in the peripheral direction of the drive and brake drum 46 parallel to one another. The first guide arm 64 is provided with an arcuate groove 68, in which an adjusting nut 70 is adjustably fixed. The adjusting nut 70 is also displaceably guided in a similarly arcuate adjusting groove 72, wherein the adjusting groove 72 is configured in an adjusting body 54 and runs parallel to the groove 68 of the first guide arm 64 of the tensioning device 62, as illustrated in FIGS. 2 to 7.

Figure 4:
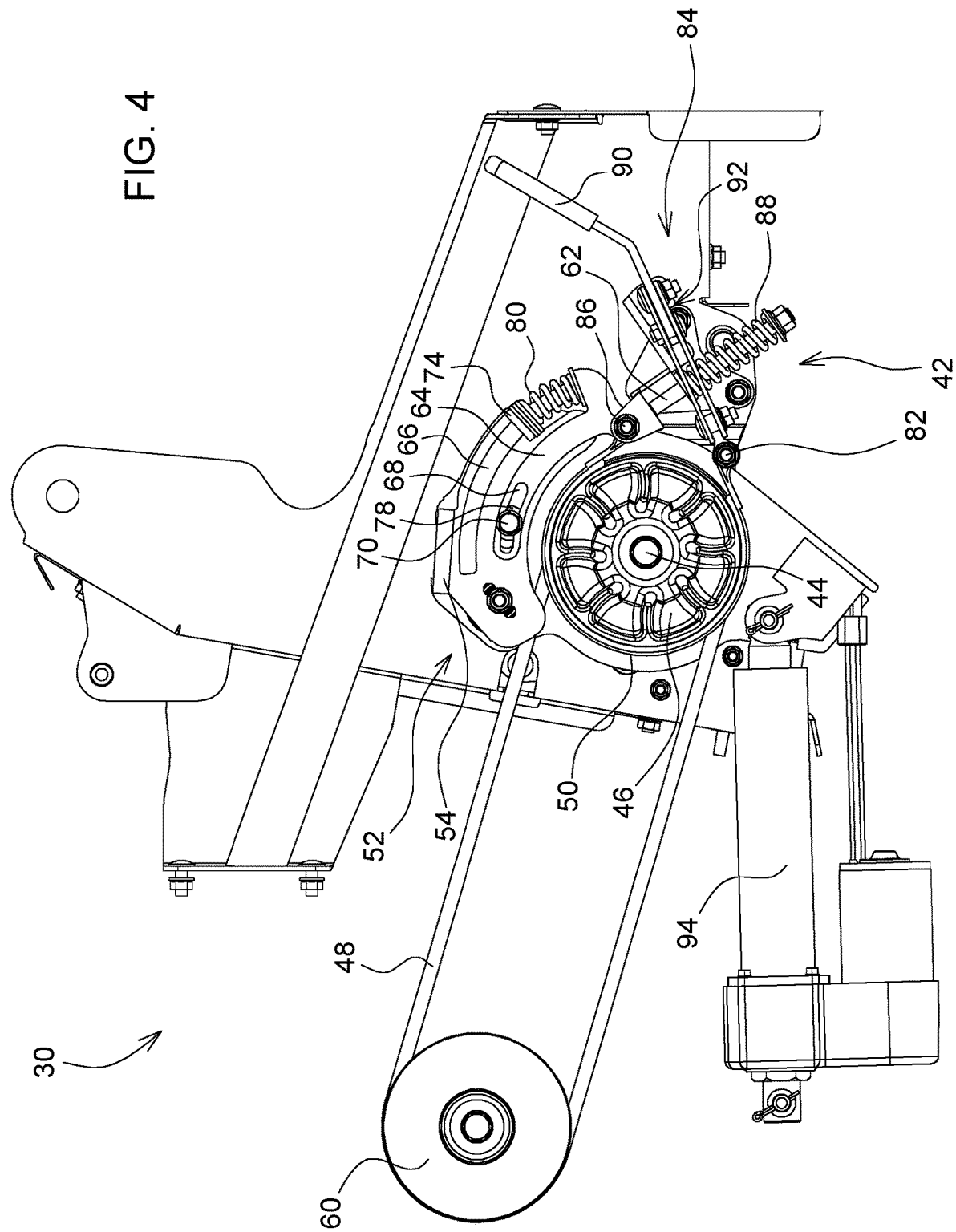
FIG. 4 is an enlarged schematic side view of the bale wrapping device disposed in an operating position for a cutting phase of the baling process.
Figure 5:
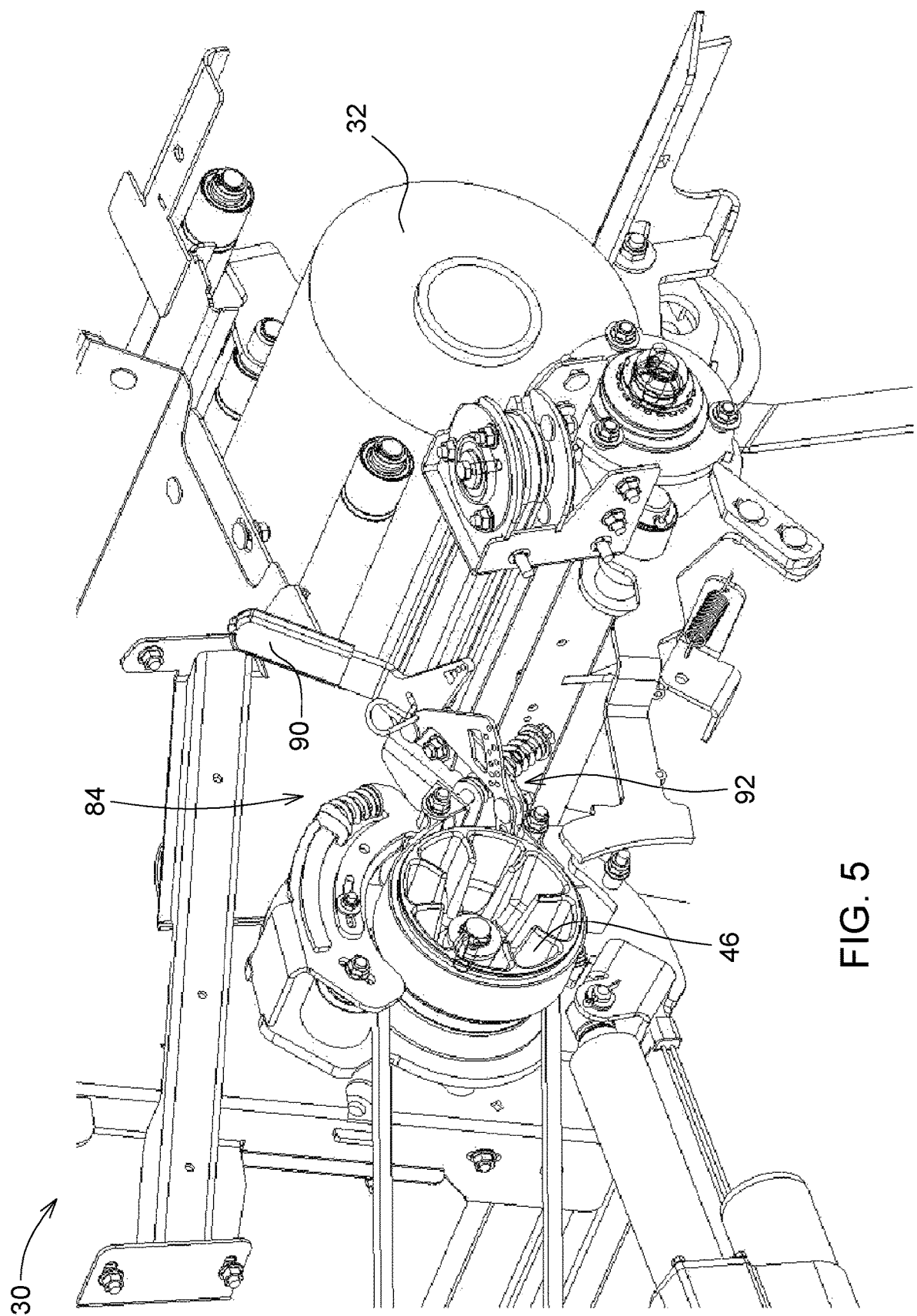
FIG. 5 is an enlarged schematic perspective view of the bale wrapping device showing a tensioning lever apparatus in a first position.
Figure 6:
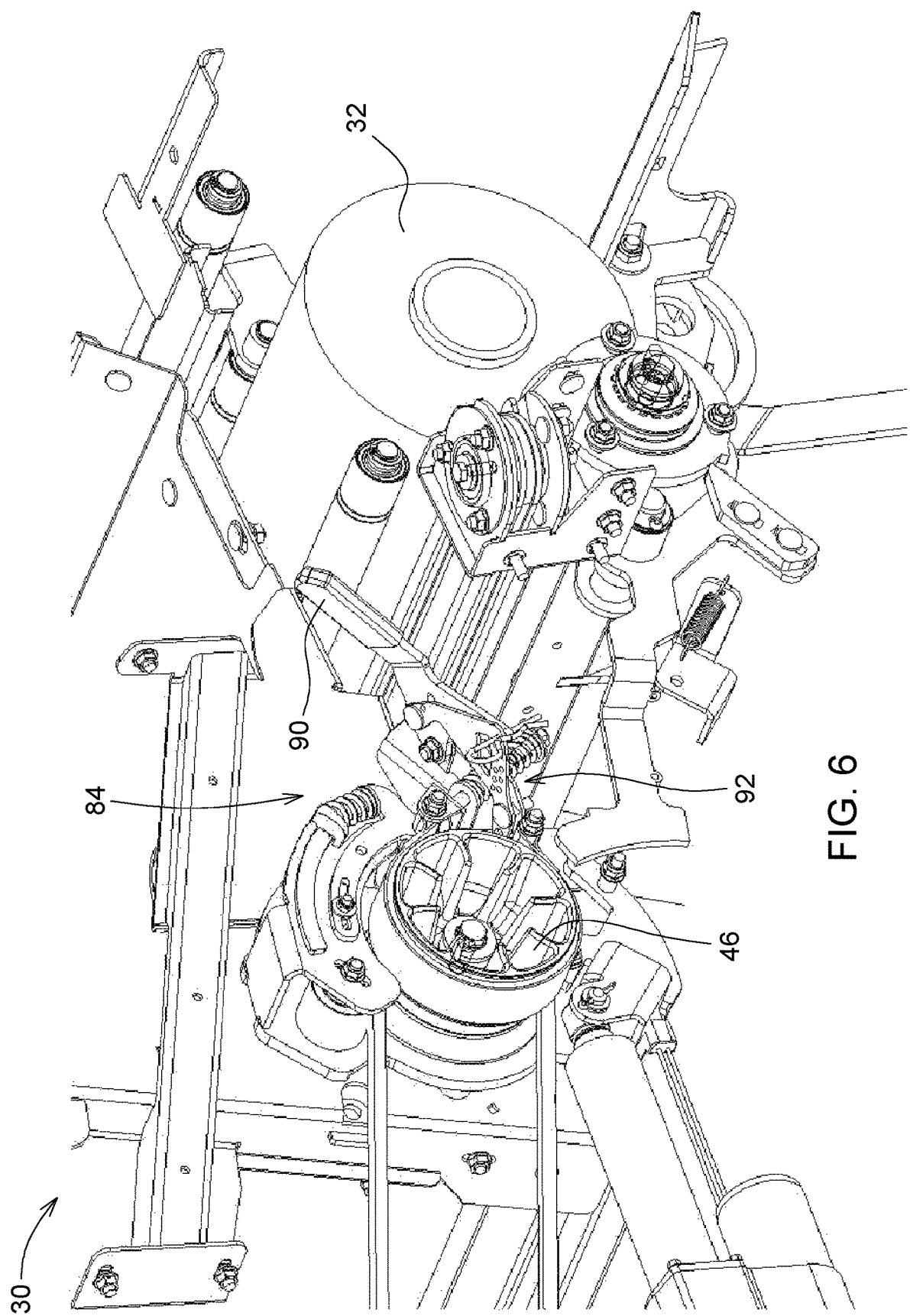
FIG. 6 is an enlarged schematic perspective view of the bale wrapping device showing the tensioning lever apparatus in a second position.

The second guide arm 66 is in engagement with a tab 74 extending from the adjusting body 54, wherein the tab 74 has an opening (not shown) through which the guide arm 66 is guided (see for example FIG. 4). The adjusting nut 70 represents a stop which comes to bear at one end 78 of the adjusting groove 72 when the adjusting body 54 is adjusted into a first extreme position according to FIG. 2, counter-clockwise relative to the tensioning device 62 in the peripheral direction. The tab 74 represents a stop which comes to bear against a spiral spring 80 arranged on the guide arm 66 when the adjusting body 54 is adjusted into a second extreme position according to FIG. 4, clockwise relative to the tensioning device 62 in the peripheral direction. As is clear, for example, from FIGS. 2 to 4, a tensioning roller is set in the first extreme position with a maximum extent on the drive belt 48, so that in the first extreme position of the adjusting body 54 said drive belt 48 is operated at a maximum tension. In the second extreme position of the adjusting body 54, however, the tensioning roller is set with a minimum extent on the drive belt 48, namely detached therefrom, so that the drive belt 48 is operated without tension and/or at a minimum tension.

The brake belt 50 is fastened at a first end 82 to a tensioning lever apparatus 84, placed around the drive and brake drum 46 and connected at a second end 86 to the tensioning device 62. The tensioning lever apparatus 84 may be fixed, in particular, to the frame of the round baler 10. The tensioning device 62 is pretensioned by means of a tensioning spring 88 relative to the frame of the round baler 10 and set such that the tensioning device 62 is held in a pretensioned position in which the adjusting nut 70 is placed in a central region of the adjusting groove and the brake belt 50 is tensioned with a pre-tensioning around the drive and brake drum 46.

Moreover, a freewheel apparatus (not shown) is provided between the drive means, which is connected to the belt drive roller 60, and the belt drive roller 60 so that it is ensured that the drive means and drive roller 44 are able to adopt different rotational speeds. This will occur, for example, when in the wrapping phase the round bale drives the drive element, in particular one of the pressing rollers 26, at a first rotational speed and at the same time entrains the wrapping material so that the wrapping material roller 32 acquires a relatively high unrolling speed. Due to its smaller diameter the drive roller 44 in engagement with the wrapping material roller 32 acquires an even greater rotational speed which in turn may be higher than the rotational speed of the drive means and/or than that of the relevant pressing roller 26. It is effectively ensured by the freewheel that the belt drive roller 60 may be operated in this state and may run ahead of the drive means in the rotational direction of the drive, and/or may have a higher rotational speed and is only connected fixedly in terms of rotation to the pressing roller 26 in the opposing direction.

The adjusting device 52 is also activatable by a further actuator 94 according to operating phases of the round baler 10, wherein the operating phases comprise at least one introduction phase, a wrapping phase and a cutting phase. The further actuator 94 is connected to a control unit (not shown) which, by means of suitable sensors, generates control signals corresponding to the prevailing operating phases and activates the further actuator 94 as a function of these control signals in order to adjust the adjusting device 52.

As shown in all of the figures, but in particular in FIGS. 2 to 12, the bale wrapping device 30 includes the tensioning lever apparatus 84 and the brake belt 50 is connected to the tensioning lever apparatus 84. Since the brake belt 50 is fastened at the first end 82 to the tensioning lever apparatus 84, placed around the drive and brake drum 46, and at the second end 86 connected to the tensioning device 62 and the tensioning device 62 is pretensioned by means of the tension spring 88 relative to the frame of the round baler 10, the pre-tensioning of the brake belt 50 is adjustable by means of the tensioning lever apparatus 84 between at least three different pre-tensionings, by the first end 82 being displaced. In particular, the tensioning lever apparatus 84 includes an actuatable tensioning lever 90 which cooperates with a lever rod system 92, via which a pre-tensioning of the brake belt 50 may be set, in particular, by the first end 82 of the brake belt 50 being correspondingly displaced. In other words, the first end 82 of the brake belt 50 is connected to the lever rod system 92 and the first end 82 of the brake belt 50 is adjustable, preferably able to be set and/or fixed, by the lever rod system 92, such that the brake belt 50 is tensionable in a variable manner by means of the lever rod system 92 in at least three different pre-tensionings. To this end, the tensioning lever apparatus 84, in particular the tensioning lever 90 and the lever rod system 92, may be moved into a first, second or third position in a variable manner by actuating the tensioning lever 90, and thus the brake belt 50 may be tensioned in one of the at least three different pre-tensionings, wherein the first position (shown in FIGS. 5, 9, and 10) correlates and/or coincides with the first pre-tensioning, the second position (shown in FIGS. 6 and 11) with the second pre-tensioning, and the third position (shown in FIGS. 7 and 12) with the third pre-tensioning.

Similarly, however, the brake belt 50, in particular the first end of the brake belt 50, may also be adjustable by the lever rod system 92 and the lever rod system 92 may be adjustable by an actuator, in particular in a deactivated operating state of the bale wrapping device 30 and/or the drive and brake apparatus, such that the actuator is movable between a first position in which the brake belt 50 has a first pre-tensioning and a second position in which the brake belt 50 has a second pre-tensioning and a third position in which the brake belt 50 has a third pre-tensioning. The third position of the actuator and/or tensioning lever 90 may, in particular, be an idle state in which the brake belt 50 has no pre-tensioning since the brake belt 50 is released from the drive and brake drum 46. By the variable adjustability of the pre-tensioning of the brake belt 50 for the bale wrapping device 30, the brake torques may be set and/or fixed on the drive and brake apparatus 42 and/or on the belt drive roller 60 according to the type of wrapping material.

Referring to FIGS. 8 through 12, the tensioning lever apparatus 84 is shown and described in greater detail. The tensioning lever apparatus 84 includes the lever rod system 92. The lever rod system 92 includes the lever 90 and a connecting link assembly 130. The lever 90 includes a first aperture 132 disposed at a distal end of the tensioning lever 90. A fixed stud 138 is received through the first aperture 132. The fixed stud 138 is fixedly attached to a fixed structural component of the round baler 10, and provides an anchor for the tensioning lever 90 about which the tensioning lever 90 may rotate.

The tensioning lever 90 further includes a second aperture 134 that is aligned with a receiving aperture 148 of the connecting link assembly 130. The receiving aperture 148 of the connecting link assembly 130 is disposed at a first end thereof. A pin 136 extends through the second aperture 134 of the tensioning lever 90 and the receiving aperture 148 of the connecting link assembly 130 to couple the tensioning lever 90 and the connecting link assembly 130.

The tensioning lever 90 further includes a first position locating bore 152 that is aligned with a first position receiving bore 154 of the connecting link assembly 130. A retainer 150, such as but not limited to a snap pin, a cotter pin, a hitch pin clip, etc., may be selectively positioned within and extend through the first position locating bore 152 of the tensioning lever 90 and the first position receiving bore 154 of the connecting link assembly 130 to secure the tensioning lever 90 to the connecting link assembly 130 in the first position, shown in FIGS. 9 and 10.

The tensioning lever 90 further includes an arm 140 that extends outward away from the tensioning lever 90. The arm defines a second position locating bore 142 at a distal end thereof. The connecting link assembly 130 includes at least one second position receiving bore 144. With the retainer 150 removed from the first position locating bore 152 and the first position receiving bore 154, the tensioning lever 90 may be rotated such that the second position locating bore 142 is aligned with one of the second position receiving bores 144. The retainer 150 may be inserted and extend through the second position locating bore 142 and the second position receiving bore 144 to secure the tensioning lever 90 in the second position, shown in FIG. 11. It should be appreciated that the multiple second position receiving bores 144 shown in the Figures provide multiple different second positions, providing additional adjustability.

The implementation of the connecting link assembly 130 shown in the Figures and described herein includes a pair of parallel plates spaced apart from each other to receive the tensioning lever 90 therebetween. The pair of plates of the connecting link assembly 130 are secured together by at least a fastener 156 disposed near a second end of the connecting link assembly 130. The tensioning lever 90 may be rotated into contact with the fastener 156 when disposed in the third position. Because the third position of the tensioning lever apparatus is associated with no tension in the brake belt, the retainer 150 is not required to secure the tensioning lever 90 in the third position, shown in FIG. 12.

The connecting link assembly 130 includes an eye 146 disposed at the second end of the connecting link assembly 130. The eye is coupled to the first end 82 of the brake belt 50 to secure the connecting link assembly 130 to the brake belt 50.

A method for operating the round baler 10 provides that in an introduction phase, in which the wrapping material 33 is supplied to the pressing chamber 20, the drive and brake apparatus 42 is operated with a first brake torque on the part of the brake belt 50, in a wrapping phase, in which the wrapping material 33 and/or the further wrapping material 35 in the pressing chamber 20 is wrapped around the bale, it is operated with a second brake torque on the part of the brake belt 50 and in a cutting phase, in which the wrapping material 33 wrapped around the round bale is cut by the blade arrangement 40 from the wrapping material roller 32, it is operated with a third brake torque on the part of the brake belt 50.

It is further provided that the first brake torque is smaller than the second and/or the third brake torque, wherein the third brake torque may also be unequal to the second brake torque. By the above-described arrangement of a bale wrapping device 30 it is ensured in the introduction phase that the wrapping material 33 and/or the further wrapping material 35 may be introduced into the pressing chamber 20 with low tension/without tension. Moreover, in the wrapping phase the wrapping material 33 and/or the further wrapping material 35 are at a greater basic tension and in the cutting phase the tension on the wrapping material 33 and/or the further wrapping material 35 is further increased or optionally also reduced.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A bale wrapping device for a round baler, the bale wrapping device comprising:
   a drive roller operable to unroll a wrapping material from a wrapping material roller;
   a drive and brake apparatus attached to the drive roller;
   a brake belt coupled to the drive and brake apparatus for braking the drive and brake apparatus; and
   a tensioning lever apparatus connected to the brake belt, the tensioning lever apparatus including:
      a tensioning lever defining a first aperture configured for receiving a fixed stud of the round baler therethrough for pivotal attachment about the fixed stud relative to the round baler;
      wherein the tensioning lever defines a first position locating bore, and includes an arm extending outward away from the tensioning lever, with the arm defining a second position locating bore;
      a connecting link assembly extending between a first end coupled to the tensioning lever and a second end coupled to the brake belt;
      wherein the connecting link assembly defines a first position receiving bore positioned proximate the first end thereof for alignment with the first position locating bore, and a plurality of second position receiving bores positioned for alignment with the second position locating bore, with each respective one of the plurality of second position receiving bores positioned to align with the second position locating bore in a respective lever position, whereby each respective lever position provides a different pre-tension of the brake belt; and
      a retaining pin selectively positionable within the first position locating bore and the first position receiving bore when aligned together, or within the second position locating bore and one of the plurality of second position receiving bores when aligned together.

2. The bale wrapping device set forth in claim 1, wherein the tensioning lever defines a second aperture, and the connecting link assembly defines a receiving aperture aligned with the second aperture of the tensioning lever, with a pin extending through the second aperture and the receiving aperture whereby the connecting link assembly and the tensioning lever are rotatably attached relative to each other via the pin.

* * * * *